(No Model.)
S. Z. DE FERRANTI.
CONVEYING ELECTRIC ENERGY.
No. 394,838. Patented Dec. 18, 1888.
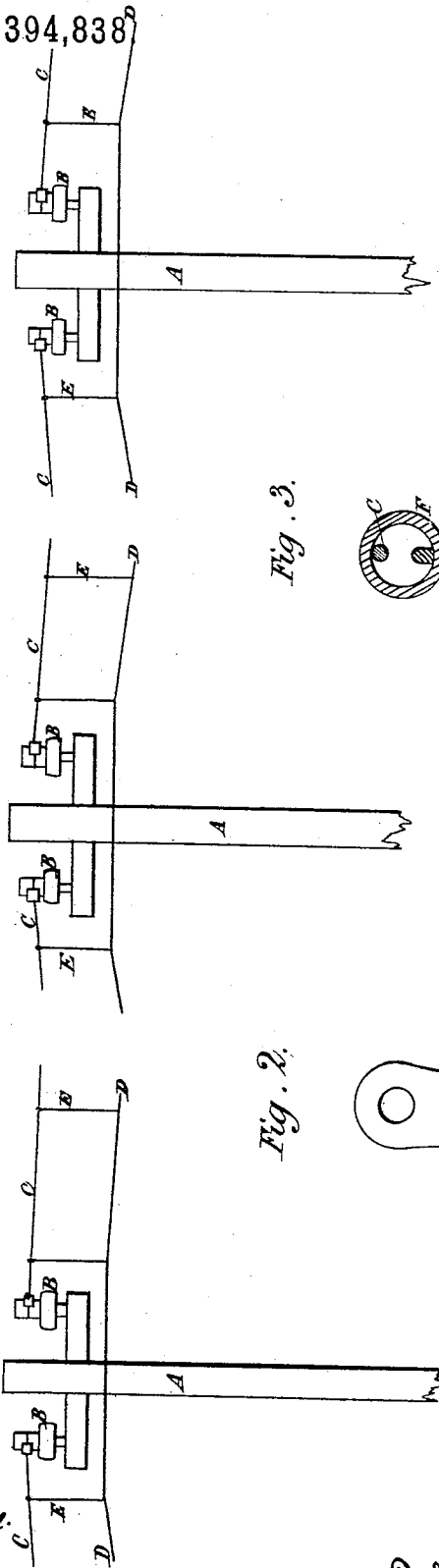
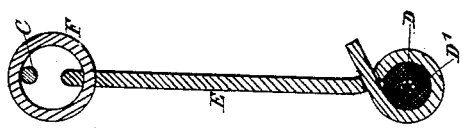
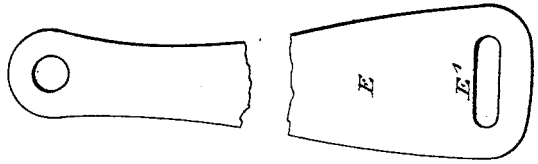
Witnesses,
L. A. Wight.
Balter De Jong.
Inventor.
Sebastian Ziani de Ferranti,
By his Attys.
Baldwin Davidson & Wight.

United States Patent Office.

SEBASTIAN ZIANI DE FERRANTI, OF HAMPSTEAD, COUNTY OF MIDDLESEX, ENGLAND.

CONVEYING ELECTRIC ENERGY.

SPECIFICATION forming part of Letters Patent No. 394,838, dated December 18, 1888.

Application filed September 24, 1888. Serial No. 286,207. (No model.)

*To all whom it may concern:*

Be it known that I, SEBASTIAN ZIANI DE FERRANTI, a subject of the Queen of Great Britain, residing at 120 Fellowes Road, Hampstead, in the county of Middlesex, England, electrician, have invented certain new and useful Improvements in the Arrangement of Conductors for the Conveyance of Electrical Energy, of which the following is a specification.

This invention has for its object improvements in the arrangement of conductors for the conveyance of electrical energy.

When high-tension currents are employed, there is risk of an arc being formed between the conductor and its supports, and from this cause fires and other damage may arise.

To avoid this danger, I employ a conductor contained in an insulated cable, and this cable I suspend from supporting-wires strained in short lengths between insulators. I connect the cable with the supporting-wires by links of leather or other insulating or semi-insulating material, such as to be instantly destroyed by the heat of an arc if formed in its vicinity. Thus the insulation of the conductor is insured primarily by its dielectric covering within the cable. Then, should a fault occur in the cable, the current will be stopped first by the insulation of the suspending-links and by that of the suspending-wire. This alone affords a high degree of security; but, nevertheless, if the insulation of a length of the suspending-wire should fail and if a fault should exist in the cable near to one of the links, and if this link should happen to be moist, then an arc might be formed along the link from the cable to the suspending-wire; but this would be but momentary, for the link would be destroyed by the heat and the cable would fall away to such a distance from the suspending-wire as to immediately extinguish the arc before other injury could be done.

In the drawings annexed, Figure 1 is an elevation showing a conductor in an insulated cable and suspended in the manner above described. Fig. 2 is a side view of one of the links. It consists of a thong of leather. Fig. 3 is a section of the same, and also of the cable, the supporting-wire, and a ring by which the thong is connected with the supporting-wire.

A A A are posts for supporting the conductor at intervals.

B B B are earthenware or glass insulators carried by arms upon the posts.

C C C are supporting-wires strained between the insulators.

D is a cable containing the conductor, surrounded in the usual way with any suitable insulating material, D'.

E E are leather thongs by which the cable D is suspended from the insulated supporting-wires C C. As will be seen, there is a hole in the thong at E', and when it has been passed around the cable the other end of the thong is inserted through the hole.

F is a split metal ring passed through the thong and around the supporting-wire. The arms of the post are so formed that the cable hangs well clear of the posts.

What I claim is—

1. The combination consisting of the posts or suitable supports, A A, the insulators B B, the short insulated supporting-wires C C, the cable D, containing the conductor, surrounded by an insulating or dielectric covering, and the insulating-links E E, connecting the cable with the supporting-wires.

2. The combination consisting of the posts or suitable supports, A A, the insulators B B, the insulated supporting-wires C C, the cable D, containing the conductor, and the insulating-links E E, connecting the cable with the supporting-wires, such links being of leather or like material, which on the formation of an arc in its vicinity is destroyed by the heat.

3. The combination consisting of the posts or suitable supports, A A, the insulators B B, the short insulated sections of supporting-wires C C, connected with said insulators, the cable or conductor D, and the insulating-links E E, suspending said conductor from the short insulated sections of wire C C.

SEBASTIAN ZIANI DE FERRANTI.

Witnesses:
    JNO. H. WHITEHEAD,
  24 *Southampton Buildings, London.*
    WALTER J. SKERTEN,
  17 *Gracechurch Street, London, E. C.*